Sept. 23, 1924.

J. R. THOMAS ET AL 1,509,116

INSECT DESTROYER

Filed Sept. 19, 1923

INVENTORS
J. R. Thomas
& J. L. Floyd.
BY Watson E. Coleman
ATTORNEY.

Patented Sept. 23, 1924.

1,509,116

UNITED STATES PATENT OFFICE.

JAMES R. THOMAS AND JAMES L. FLOYD, OF KENTON, TENNESSEE.

INSECT DESTROYER.

Application filed September 19, 1923. Serial No. 663,628.

*To all whom it may concern:*

Be it known that we, JAMES R. THOMAS and JAMES L. FLOYD, citizens of the United States, residing at Kenton, in the county of Obion and State of Tennessee, have invented certain new and useful Improvements in Insect Destroyers, of which the following is a specification, reference being had to the accompanying drawings.

This invention relates to apparatus for destroying night flying insects. An important object of the invention is to provide in combination with means for attracting night flying insects, means for singeing the wings thereof and for collecting the insects as their wings are singed.

A further object of the invention is to provide a device of this character which may be very cheaply operated and which will not require the attention of the operator during the period of its use.

A still further object of the invention is to provide a device having in combination a light for attracting insects and means for drawing upwardly about a shield arranged about the light to prevent its breakage by the oncoming insects, a blast of highly heated air or a flame so that the insects attracted to the light will have their wings singed so that they are destroyed.

A further object of the invention is to provide a device of this character which is simple in construction and operation, durable in service and a general improvement in the art.

These and other objects I attain by the construction and arrangement shown in the accompanying drawings wherein for the purpose of illustration is shown a preferred embodiment of our invention and therein:

Figure 1:
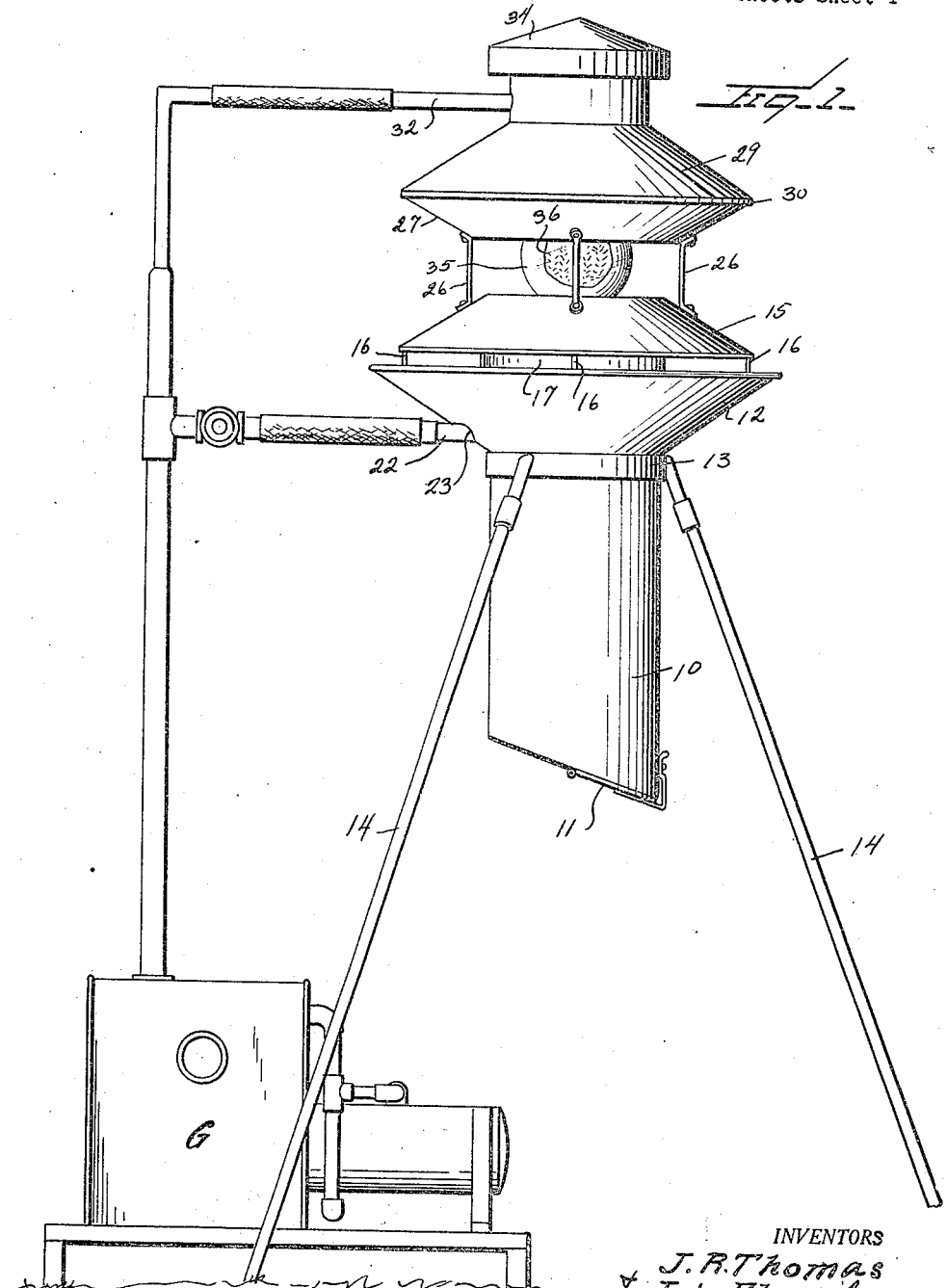
Figure 1 is a side elevation showing an insect destroyer constructed in accordance with our invention.
Figure 2:
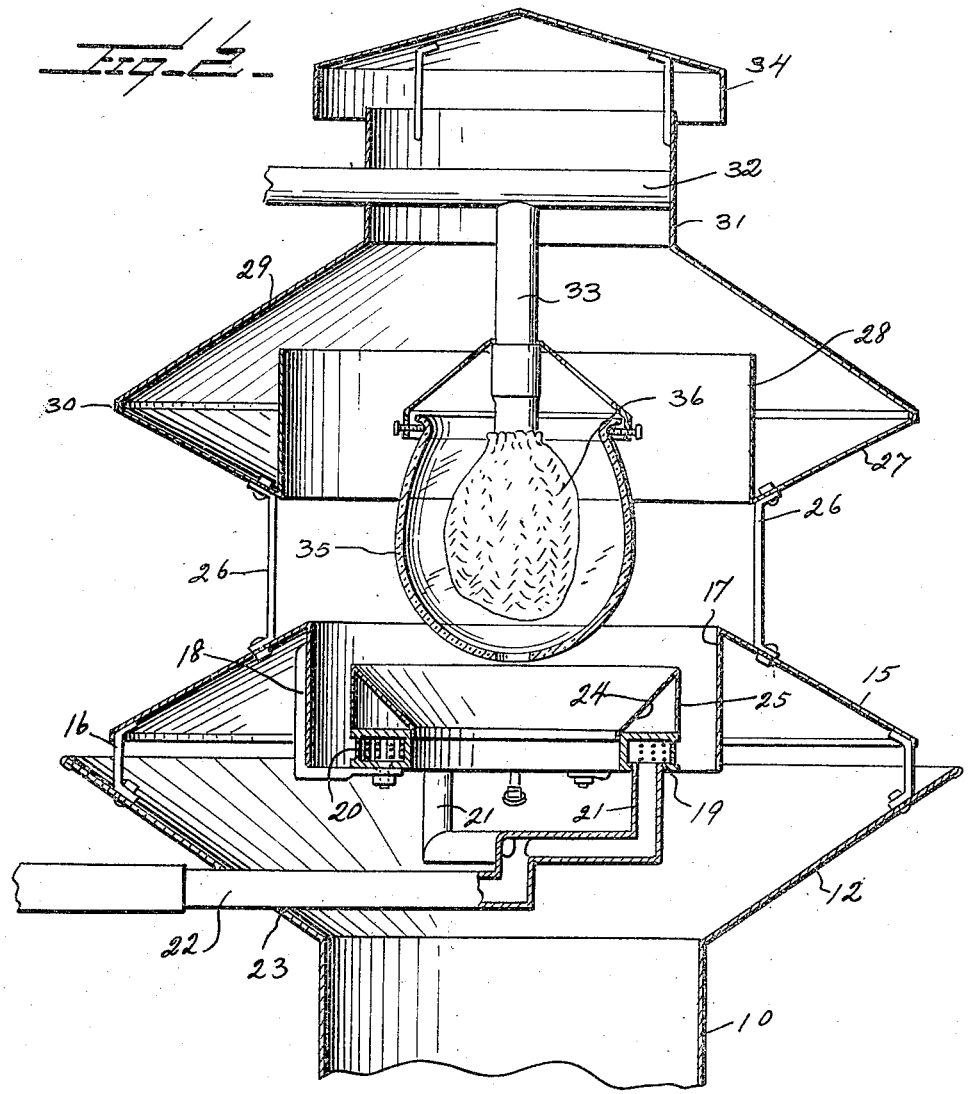
Figure 2 is a vertical sectional view through the apparatus.
Figure 3:
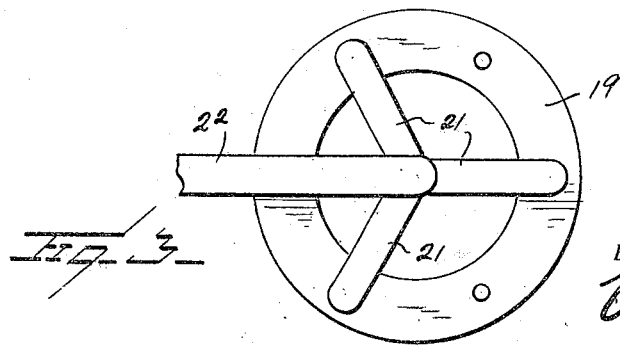
Figure 3 is a bottom plan view of the burner employed.

Referring now more particularly to the drawings, the numeral 10 indicates a collecting drum preferably cylindrical having a portion of the bottom, as indicated at 11, hinged so that insects collected therein may be removed. Extending upwardly and outwardly from the upper edges of the drum is a frusto-conical flange 12 forming means for directing into the drum 10 any insects falling thereon. The drum 10 is preferably supported by means of a ring 13 having tripod legs 14 so that the drum may be supported at a convenient distance from the ground.

The numeral 15 indicates a frusto conical flange of smaller external diameter than the frusto-conical flange 12 and inverted as respects the flange 12. The upper surface of the flange 15 is highly polished to form a reflector and the flange 15 is supported by spaced supporting elements 16 from the flange 12 so that the adjacent faces of the flanges are spaced at the outer edges thereof, the outer edge of the flange 12 projecting beyond the outer edge of the flange 15. Extending downwardly from the inner edge of the reflector flange 15 is a vertical cylindrical wall 17 to which is secured supports 18, the ends of which extend inwardly to support a burner 19. The burner 19 is in the form of a hollow flat ring, the outer wall of which is perforated as indicated at 20 and with the burner communicates through a plurality of branch pipes 21, a fuel feed pipe 22, the outer end of which projects through an opening 23 formed in the flange 12. Projecting outwardly and upwardly from the inner upper edge of the burner 19 is a baffle wall 24 frusto conical in form and having depending from its upper outer edge a vertical wall 25, the lower end of which contacts the upper outer edge of the burner 19. The burner and wall 25 are in spaced relation to the vertical cylindrical wall 17 depending from the upper edge of the reflector flange 15 and formed therebetween is draft space through which air may pass to accommodate the burner, after which it is directed upwardly between the walls 25 and 17 for a purpose presently to appear. Air may furthermore enter through the center of the burner and through the baffle wall 24 for a purpose presently to appear.

Extending upwardly from the reflector flange 15 adjacent the inner upper edge thereof, are spaced supports 26 which engage the lower inner edge of a frusto-conical reflector flange 27 which is inverted as respects the flange 15 so that the spaced edge is arranged uppermost. Extending upwardly from the lower inner edge of the reflector flange 27 is a vertical cylindrical wall 28. The numeral 29 designates a crown or cap in the form of a frusto conical flange having its lower edge 30 bent to enclose the upper outer edge of the inverted frusto conical reflector flange 27. Projecting upwardly from the upper edge of the cap is a vertical cylindrical wall 31 in which is mounted a fuel feed pipe 32. From the fuel feed pipe extends a branch 33, the lower end of which is provided with a mantle mounting projecting into the space between the adjacent inner edges of the reflector flanges 15 and 27. The upper end of the vertical wall 31 of the cap is surmounted by a cowl 34. The branch pipe 33 forms a support for a protecting shield 35 for the mantle 36 of the illuminating burner, this burner shield having an opening at its lower end permitting the entrance of air for mixture with fuel at the burner or mantle.

In use the fuel feed pipes 22 and 32 are connected with any suitable source of gas or fuel supply G and the burner 19 and mantle 36 ignited. From the mantle a strong light is shed which is augmented by the reflectors 15 and 27, thus providing a light which is highly attractive to night flying insects of any species. In these species are included many destructive beetles, moths and flies. The attracted insects flying to the light and approaching the globe or shield 35 will pass through a wall of flame which surrounds the shield and the wings thereof will be singed or the insect entirely cremated. Some of the insects, by the strong draft created by the burner, will be carried upwardly and remain in the path of the flame until they are entirely consumed. Others with their wings singed will fall upon the frusto-conical flange 15 and finally drop from this flange to the flange 12 from which they will be deposited in the drum 10 for collection and destruction. Still others of the insects will fall upon the conical baffle 24 and be deflected thereby through the center of the burner and into the drum 10.

It will be seen that by use of an apparatus of this character a great many insects may be destroyed during the night hours and the device has been found particularly efficient in fighting the ravages of the boll weevil and the lesser moths.

It will furthermore be observed that the construction hereinbefore set forth is capable of certain changes and modifications without materially departing from the spirit of our invention and we accordingly do not limit ourselves to such specific structure except as hereinafter claimed.

What is claimed is:—

1. A device for destroying insects including a drum, means for supporting the drum in an elevated position, a frusto-conical flange upon the upper end of the drum, opposed spaced frusto-conical reflector flanges supported from the flange of the drum and of less size than the flange of the drum, a ring burner arranged within the lower reflector flange, an illuminating element arranged intermediate the reflector flanges, and means for directing flame from the burner upwardly about the illuminating element.

2. A device for destroying insects including a drum, means for supporting the drum in an elevated position, a frusto-conical flange upon the upper end of the drum, opposed spaced frusto-conical reflector flanges supported from the flange of the drum and of less size than the flange of the drum, a ring burner arranged within the lower reflector flange, an illuminating element arranged intermediate the reflector flanges, and means for directing flame from the burner upwardly about the illuminating element, including a depending cylindrical wall secured at its upper end to the upper inner edge of the lower reflector flange.

3. A device for destroying insects including a drum, means for supporting the drum in an elevated position, a frusto-conical flange upon the upper end of the drum, opposed spaced frusto-conical reflector flanges supported from the flange of the drum and of less size than the flange of the drum, a ring burner arranged within the lower reflector flange, an illuminating element arranged intermediate the reflector flanges, and means for directing flame from the burner upwardly about the illuminating element, including a depending cylindrical wall secured at its upper end to the upper inner edge of the lower reflector flange, said wall having supports mounted thereon for supporting said burner.

4. A device for destroying insects including a drum, means for supporting the drum in an elevated position, a frusto-conical flange upon the upper end of the drum, opposed spaced frusto-conical reflector flanges supported from the flange of the drum and of less size than the flange of the drum, a ring burner arranged within the lower reflector flange, an illuminating element arranged intermediate the reflector flanges, means for directing flame from the burner upwardly about the illuminating element, including a depending cylindrical wall secured at its upper end to the upper inner edge of the lower reflector flange, said wall having supports mounted thereon for supporting said burner, and a cap mounted upon the upper reflector forming a support for a cowl flue.

In testimony whereof we hereunto affix our signatures.

JAMES R. THOMAS.
JAMES L. FLOYD.